May 1, 1945.  E. J. REGAN  2,375,038
ROTARY DRIVE DEVICE
Filed March 3, 1943

INVENTOR.
EDMUND J. REGAN
BY
ATTORNEY

Patented May 1, 1945

2,375,038

UNITED STATES PATENT OFFICE 2,375,038

ROTARY DRIVE DEVICE

Edmund J. Regan, Bloomfield, N. J., assignor to Federal Telephone & Radio Corporation, New York, N. Y., a corporation of Delaware Application March 3, 1943, Serial No. 477,849

2 Claims. (Cl. 74—216)

This invention relates to improvements in rotary drive devices and is particularly directed to a construction including a drive wheel having an improved friction tire arrangement. It is especially adapted for use in apparatus in which the drive wheel engages a relatively flat rotating surface such as a disk or cone, and is desirably provided with a relatively narrow drive surface.

In drives of this type the drive surface tends to wear down, thereby broadening the drive surface and reducing the effective diameter of the wheel. An object of the invention is to provide an arrangement whereby the narrow drive surface of the tire may be readily renewed when worn. This is in general accomplished by employing a drive ring or tire of friction material mounted in an annular channel on the rim, the ring and channel being provided with cooperating surfaces arranged to hold the ring in a plurality of positions each with a different portion of the ring exposed in driving position. Such exposed portions of the ring are shaped in the form of ridges to provide the desired narrow contact.

A construction of this type is conveniently provided by employing a ring that is substantially square in cross-section, and seating it in a V-shaped channel in the rotary drive member. With this arrangement each angle between flat faces of the ring forms a narrow drive ridge when the opposite angle is seated in the channel. By twisting the ring any ridge may be located in driving position and will be held firmly in that position by the engagement of the ring faces opposite to such ridge with the side walls of the channel.

The ring is advantageously constructed of resilient material such as natural or synthetic rubber or rubber substitutes, and in this form is sufficiently resilient to facilitate location, adjustment and removal by stretching the ring to a diameter greater than that of the channel, the ring being proportioned so that when it is released it will fit tightly against the channel walls, thereby assuring freedom from circumferential slippage.

Rings suitable for this purpose may be conveniently formed by successive radial cuts through a cylinder of friction material such as natural or synthetic rubber or rubber substitute.

Figure 1:
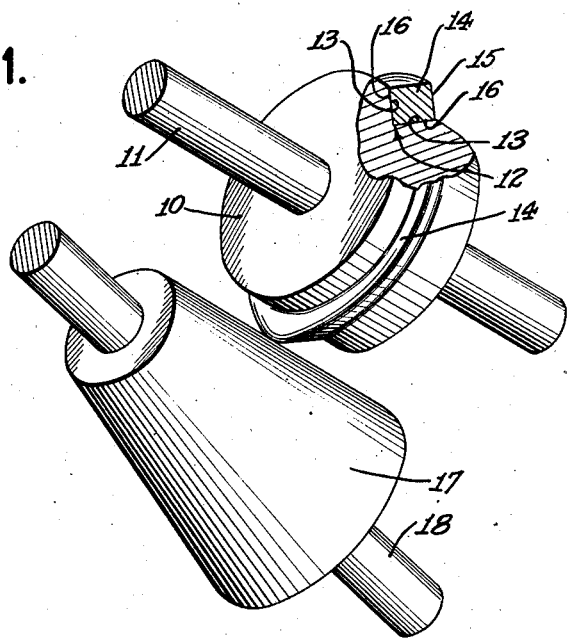
Figure 2:
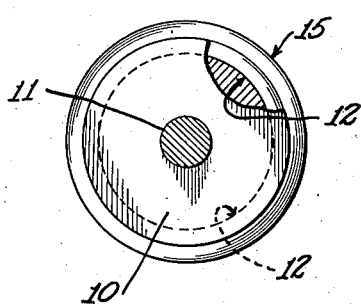
Figure 3:
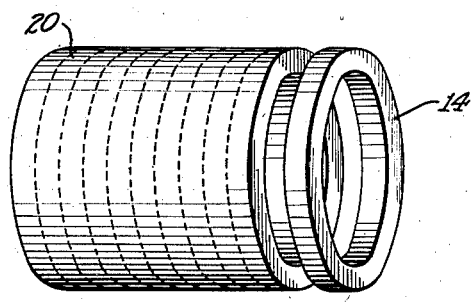

Other objects and advantages will appear from the following description considered in connection with the accompanying drawing, in which Fig. 1 is a diagrammatic view of a drive apparatus embodying the invention, with parts broken away;

Fig. 2 is a side elevation of the drive wheel shown in Fig. 1 with parts broken away, and Fig. 3 is a diagrammatic view illustrating a method of forming the drive ring.

In the specific form illustrated the drive wheel 10 is in the form of a disk mounted on shaft 11 and provided with a V-shaped annular channel or groove 12 with sides 13 inclined to each other at an angle of substantially 90°. The drive ring 14 is square in cross-section and is proportioned so that one of its edges or ridges 15 will project substantially beyond the wheel 10 while the opposite sides 16 are held snugly against the sides 13 of channel 12 by contraction of the ring.

A cone 17 on shaft 18 is engaged by the narrow ridge 15 of ring 14, and shaft 11 is parallel to the continuous element of the surface of cone 17, so that the disk 10 may be shifted along the cone surface to vary the effective drive speed in the usual manner.

Ring 14 may conveniently be formed from a cylinder 20 of suitable material by making successive radial cuts along dotted lines 21.

The ring 14 is slightly smaller in diameter than disk 10 and is stretched sufficiently to permit the operator to slip it over the outside of the disk and to twist it into position with one angle 15 in register with the bottom of channel 12, the ring being seated firmly in the channel when released. To provide a fresh driving ridge 15 when the ridge formerly in use has become worn it is necessary only to twist the ring 14 in channel 12 until another ridge 15 extends outwardly in drive position, with the opposite ridge located at the bottom of said channel.

While the wheel 10 has been referred to as a drive wheel it will be understood that either the wheel or the cooperating drive element such as cone 17 may be the driving member.

While resilient material is preferably employed for constructing ring 14 and permits the positioning and shifting of the ring in channel 12 without requiring any movement or removal of the channel walls, this disclosure is intended to be illustrative rather than restrictive. Other modifications and variations in the described construction may be made without departing from the invention as set forth in the claims.

What is claimed is:

1. A rotary drive device comprising a rotatable drive member provided with a peripheral V-shaped channel the sides whereof converge at an angle of substantially 90° to one another from the periphery of the drive member toward the interior thereof, and a drive tire seated in said channel, said drive tire being formed as an annulus having a substantially square cross section, with the inner peripheral edge thereof lying in the bottom of said channel, the outer peripheral edge of said annulus projecting beyond the periphery of said drive member and substantially one-half of the peripheral surface of said annulus engaging the sides of said channel, said tire being of resilient material whereby the tire may be turned in the channel without removal therefrom to have different edges of the tire project beyond the periphery of the drive member, and to assume upon said turning one of four predetermined angular positions, whereby the drive surface of said tire is limited to a substantially curvilinear configuration of minimum width.

2. Rotary drive device according to claim 1, of the type having two rotary members, also including a cooperating driven element having a surface extending longitudinally substantially in a direction normal to the axis of said drive member, and engaged by the projecting edge of said drive tire, whereby the contact between said drive tire and said driven element is confined to a relatively narrow curvilinear area.

EDMUND J. REGAN.